US010975666B2

(12) United States Patent
Schroeder et al.

(10) Patent No.: US 10,975,666 B2
(45) Date of Patent: Apr. 13, 2021

(54) DOWNHOLE WELDING PROCESS AND TOOL THEREFORE

(71) Applicant: NuWave Industries Inc., Marwayne (CA)

(72) Inventors: Wesley Chad Schroeder, Edmonton (CA); Shaun Calvin Morton, Mayerthorpe (CA); Kade Demuth, Pierceland (CA)

(73) Assignee: NuWave Industries Inc., Marwayne (CA)

( * ) Notice: Subject to any disclaimer, the term of this patent is extended or adjusted under 35 U.S.C. 154(b) by 385 days.

(21) Appl. No.: 16/009,437

(22) Filed: Jun. 15, 2018

(65) Prior Publication Data

US 2018/0363424 A1    Dec. 20, 2018

Related U.S. Application Data

(60) Provisional application No. 62/521,807, filed on Jun. 19, 2017.

(51) Int. Cl.
*E21B 33/10* (2006.01)
*E21B 41/00* (2006.01)
*B23K 23/00* (2006.01)

(52) U.S. Cl.
CPC .............. *E21B 41/00* (2013.01); *B23K 23/00* (2013.01); *E21B 33/10* (2013.01)

(58) Field of Classification Search
CPC ......... E21B 33/10; E21B 41/00; B23K 23/00; B23K 37/0276
See application file for complete search history.

(56) References Cited

U.S. PATENT DOCUMENTS

| 2,286,075 | A | * | 6/1942 | Evans | 166/58 |
| 4,585,158 | A | * | 4/1986 | Wardlaw, III | E21B 36/008 228/232 |
| 8,662,169 | B2 | * | 3/2014 | Cortez | B23K 1/0006 166/256 |
| 2018/0085850 | A1 | * | 3/2018 | Huang | E21B 33/1204 |
| 2018/0363424 | A1 | * | 12/2018 | Schroeder | B23K 23/00 |

* cited by examiner

*Primary Examiner* — Daniel P Stephenson
(74) *Attorney, Agent, or Firm* — Foley & Lardner LLP (57) ABSTRACT

A welding tool for welding a blanking plate within a wellbore casing downhole thereby sealing the wellbore is described. The tool comprises a tubular body of a diameter sufficiently narrow to fit in a wellbore casing, the tubular body having a downhole end and a surface end; and a welding head assembly connected to the downhole end of the tubular body. The welding head assembly comprises a connector device for retaining a blanking plate to be welded within the wellbore casing, and a welding powder container which comprises a chamber for holding the exothermic welding powder, the chamber having at least a portion extending adjacent the blanking plate to be retained and proximate the wellbore casing to which the blanking plate is to be welded when the tool is positioned downhole in the wellbore casing; and an igniter wire opening for accommodating an igniter wire extending into the chamber.

20 Claims, 8 Drawing Sheets

DOWNHOLE WELDING PROCESS AND TOOL THEREFORE

TECHNICAL FIELD

The present invention relates to welding tools and processes and more specifically to tools for allowing welding downhole in a well and processes therefore.

BACKGROUND

Oil wells at the end of their life cycle require methods of abandonment. Ideally, the goal of abandonments is to safely seal off the well, and recover the land space the well occupies.

Current conventional methods of abandoning a well include the placement of an expandable plug in the wellbore and the welding of a steel cap at the top of the surface casing. Conventional abandonment methods generally require the excavation of a few meters of earth surrounding the well casing to expose the casing followed by external cutting of the casing with a torch and the placement of a well cap welded using portable arc welding equipment. These methods are time consuming and costly and have an environmental impact due to the excavation of the surrounding earth.

Wells are typically sealed with an expanding plug that is placed into the wellbore. It is more desirable to weld a steel blank off plate, also referred to as a blanking plate, into the wellbore, however, current methods are not able to avoid the excavation process associated therewith.

Traditional arc welding cannot be done downhole due to size constraints of the equipment involved and therefore cannot overcome the various downsides associated with excavation and external cutting.

One option is wire fed welding. However, wire fed welding is very sensitive and highly susceptible to impurities and would require extensive cleaning of the internal casing before welding. Even with extensive cleaning, weld contamination is a significant issue and obtaining a quality weld would be difficult. Further, wire fed welding is impractical as it is a complicated process and requires a significant amount of equipment.

A less impactful and/or more simple and/or less costly solution is therefore desired that potentially eliminates or mitigates these or other shortcomings in the field.

SUMMARY OF INVENTION

A welding tool is provided for use downhole in a wellbore casing for delivering a well component to be welded to a downhole surface of a wellbore casing or component thereof and for welding the well component to the downhole surface. In one embodiment, the welding tool is for sealing the wellbore casing and permits delivery of a blanking plate downhole in the wellbore casing and welding of the blanking plate to the internal surface of the casing thereby sealing the wellbore. As the welding tool is adapted to fit down the wellbore casing, excavation around the well is avoidable. The welding tool allows for exothermic welding of the blanking plate to the wellbore casing.

In one embodiment, the present invention provides for a welding tool for welding a well component to a downhole surface of a wellbore casing or component thereof, the welding tool comprising:

a tubular body of a diameter sufficiently narrow to fit in a wellbore casing, the tubular body having a downhole end and a surface end; and a welding head assembly connected to the downhole end of the tubular body, the welding head assembly comprising:

a connector device for retaining a well component to be welded to a downhole surface of the wellbore casing or component thereof, and a welding powder container comprising:

a chamber for holding the exothermic welding powder, the chamber having at least a portion extending adjacent the well component to be retained and proximate the downhole surface to which the well component is to be welded when the welding tool is positioned downhole in the wellbore casing; and an igniter wire opening for accommodating an igniter wire extending into the chamber.

In a further embodiment of the welding tool as outlined above, the welding tool further comprises a depth adjustment assembly connected to the tubular body, the depth adjustment assembly for controlling the depth into the wellbore casing to which the tubular body extends.

In a further embodiment of the welding tool as outlined above, the depth adjustment assembly comprises a portion having a diameter sufficient to friction hold the welding tool against the casing.

In a further embodiment of the welding tool as outlined above, the depth adjustment assembly comprises:

a central aperture for receiving the tubular body thereby permitting slideable passage of the depth adjustment assembly along the tubular body; and a retention device for securing the depth adjustment assembly to the tubular body.

In a further embodiment of the welding tool as outlined above, the retention device comprises a clamp for securing the depth adjustment assembly to the tubular body.

In a further embodiment of the welding tool as outlined above, the connector device for retaining the well component comprises a threaded connector for threaded interaction with a corresponding threaded connector situated on the well component.

In a further embodiment of the welding tool as outlined above, the welding powder container is a weld fixture comprising a weld fixture body defining the chamber and a hingedly attached reservoir cap permitting access to the chamber for filling thereof with the welding powder when in an opened position and substantially sealing the chamber when in a closed position.

In a further embodiment of the welding tool as outlined above, the weld fixture body comprises an internal channel extending from the chamber to adjacent the well component to be retained and proximate the downhole surface to which the well component is to be welded when the welding tool is positioned downhole in the wellbore casing.

In a further embodiment of the welding tool as outlined above, the welding tool further comprises a combustible barrier sealing the chamber from the well component to be retained, the combustible barrier combusting upon contact with ignited weld powder.

In a further embodiment of the welding tool as outlined above, the welding tool further comprises a radial adjustment device in connection with the welding powder container for permitting radial movement of the welding powder container to accommodate wellbore casings of a different diameter.

In a further embodiment of the welding tool as outlined above, the welding head assembly comprises a plurality of weld fixtures situated at various points adjacent the well component to be retained and proximate the downhole surface to which the well component is to be welded when the welding tool is positioned downhole in the wellbore casing.

In a further embodiment of the welding tool as outlined above, the welding powder container is a tubular ring having a suitable diameter to be substantially proximate the internal circumference of the wellbore casing into which the tool is to be inserted, and wherein the tubular ring is comprised of a combustible material sealing the ring from the well component to be retained, the combustible material combusting upon contact with ignited weld powder.

In a further embodiment of the welding tool as outlined above, the well component is a blanking plate for sealing the wellbore casing.

In a further embodiment of the welding tool as outlined above, the blanking plate comprises a threaded connected for permitting retention to the connector device.

In a further embodiment of the welding tool as outlined above, the welding tool further comprises an ignitor wire for extension from the powder chamber through the ignitor wire opening and for connection to a remote ignition control.

In a further embodiment of the welding tool as outlined above, the welding tool further comprises one or more wire retention devices for securing the wire to the tubular body.

In yet another embodiment, the present invention provides for a welding tool for welding a blanking plate within a wellbore casing downhole thereby sealing the wellbore, the welding tool comprising:
  a tubular body of a diameter sufficiently narrow to fit in a wellbore casing, the tubular body having a downhole end and a surface end; and
  a welding head assembly connected to the downhole end of the tubular body, the welding head assembly comprising:
    a connector device for retaining a blanking plate to be welded within the wellbore casing, and
    a welding powder container comprising:
      a chamber for holding the exothermic welding powder, the chamber having at least a portion extending adjacent the blanking plate to be retained and proximate the wellbore casing to which the blanking plate is to be welded when the welding tool is positioned downhole in the wellbore casing; and
      an igniter wire opening for accommodating an igniter wire extending into the chamber.

In a further embodiment of the welding tool as outlined above, the welding tool further comprises a depth adjustment assembly connected to the tubular body, the depth adjustment assembly for controlling the depth into the wellbore casing to which the tubular body extends.

In a further embodiment of the welding tool as outlined above, the depth adjustment assembly comprises a portion having a diameter sufficient to friction hold the welding tool against the casing.

In a further embodiment of the welding tool as outlined above, the depth adjustment assembly comprises:
  a central aperture for receiving the tubular body thereby permitting slideable passage of the depth adjustment assembly along the tubular body; and
  a retention device for securing the depth adjustment assembly to the tubular body.

In a further embodiment of the welding tool as outlined above, the retention device comprises a clamp for securing the depth adjustment assembly to the tubular body.

In a further embodiment of the welding tool as outlined above, the connector device for retaining the blanking plate comprises a threaded connector for threaded interaction with a corresponding threaded connector situated on the blanking plate.

In a further embodiment of the welding tool as outlined above, the welding powder container is a weld fixture comprising a weld fixture body defining the chamber and a hingedly attached reservoir cap permitting access to the chamber for filling thereof with the welding powder when in an opened position and substantially sealing the chamber when in a closed position.

In a further embodiment of the welding tool as outlined above, the weld fixture body comprises an internal channel extending from the chamber to adjacent the blanking plate to be retained and proximate the wellbore casing surface to which the blanking plate is to be welded when the welding tool is positioned downhole in the wellbore casing.

In a further embodiment of the welding tool as outlined above, the welding tool further comprises a combustible barrier sealing the chamber from the blanking plate to be retained, the combustible barrier combusting upon contact with ignited weld powder.

In a further embodiment of the welding tool as outlined above, the welding tool further comprises a radial adjustment device in connection with the welding powder container for permitting radial movement of the welding powder container to accommodate wellbore casings of a different diameter.

In a further embodiment of the welding tool as outlined above, the welding head assembly comprises a plurality of weld fixtures situated at various points adjacent the blanking plate to be retained and proximate the downhole wellbore casing surface to which the blanking plate is to be welded when the welding tool is positioned downhole in the wellbore casing.

In a further embodiment of the welding tool as outlined above, the welding powder container is a tubular ring having a suitable diameter to be substantially proximate the internal circumference of the wellbore casing into which the tool is to be inserted, and wherein the tubular ring is comprised of a combustible material sealing the ring from the blanking plate to be retained, the combustible material combusting upon contact with ignited weld powder.

In a further embodiment of the welding tool as outlined above, the tubular body is extendable and is comprised of a telescoping tubular body or a plurality of modular sections.

In a yet even further embodiment, the present invention provides for a method of sealing a wellbore casing comprising:
  i) providing a welding tool as outlined herein,
  ii) filing the powder container with an exothermic welding powder such that the ignitor wire is imbedded in the exothermic welding powder;
  iii) connecting a blanking plate to the welding head assembly;
  iv) placing the welding tool in the wellbore casing;
  v) igniting the exothermic welding powder.

In a yet even further embodiment, the present invention provides for the use of an exothermic welding powder to weld a blanking plate within a wellbore casing to seal the wellbore casing.

In a further embodiment of the welding tool as outlined above, the method as outlined above or the use as outlined above, the exothermic welding powder is a thermite welding powder.

In a further embodiment, the present invention provides for a welding tool for welding a well component to a downhole surface of a wellbore casing or component thereof, the welding tool comprising:
a tubular body of a diameter sufficiently narrow to fit in a wellbore casing, the tubular body having a downhole end and a surface end; and
a welding head assembly connected to the downhole end of the tubular body, the welding head assembly comprising:
a connector device for retaining a well component to be welded to a downhole surface of the wellbore casing or component thereof, and
a single welding powder container comprising:
a weld fixture comprising:
a weld fixture body defining a chamber for holding the exothermic welding powder, the chamber having at least a portion extending adjacent the well component to be retained and proximate the downhole surface to which the well component is to be welded when the welding tool is positioned downhole in the wellbore casing; and
a reservoir cap permitting access to the chamber for filling thereof with the welding powder when in an opened position and substantially sealing the chamber when in a closed position; and
an igniter wire opening for accommodating an igniter wire extending into the chamber.

DETAILED DESCRIPTION

Described herein are embodiments of downhole welding tools, systems, methods and uses thereof that are intended to be illustrative of the inventive concept and are not intended to be limiting in any way. Various modifications, adjustments, revisions, substitutions and/or alterations to the tools, methods and uses described herein may be carried out without departing from the scope or spirit of the invention and are intended to be within the scope of the invention.

It will be appreciated that reference to welding as used herein refers to and encompasses the bonding of two components together and encompasses welding, bonding, fusing and braising as appropriate. This also includes exothermic welding also sometimes referred to as thermite welding.

In various embodiments described herein, there is provided a welding tool for use downhole in a wellbore casing for delivering a well component to be welded to a downhole surface of a wellbore casing or component thereof and for welding the well component to the downhole surface. In one embodiment, the welding tool is for sealing the wellbore casing and permits delivery of a blanking plate downhole in the wellbore casing and welding of the blanking plate to the internal surface of the casing thereby sealing the wellbore. As the welding tool is adapted to fit down the wellbore casing, excavation around the well is avoidable. The welding tool allows for exothermic welding of the blanking plate to the wellbore casing by igniting of an exothermic welding powder in proximity to the blanking plate, or other suitable well component, and the surface to which the blanking plate or other suitable well component is to be welded.

One embodiment illustrative of a downhole welding tool is shown in FIGS. 1 to 5 with the welding tool shown generally at 100. The tool 100 is comprised of a tubular body 110 of a diameter sufficiently small to allow for fitting within a casing of a wellbore. The tubular body 110 may have a length sufficient to extend into the wellbore casing a desired distance from the top of the well for placing a blanking plate 140 at a desired position downhole. It will be appreciated that the tubular body 110 may have a fixed length or may be extendable using various suitable means such as for example a telescoping body or through various threaded extension sections that may be threadably attached to one or both ends of the tubular body 110 to add length to the tubular body 110.

Figure 1:
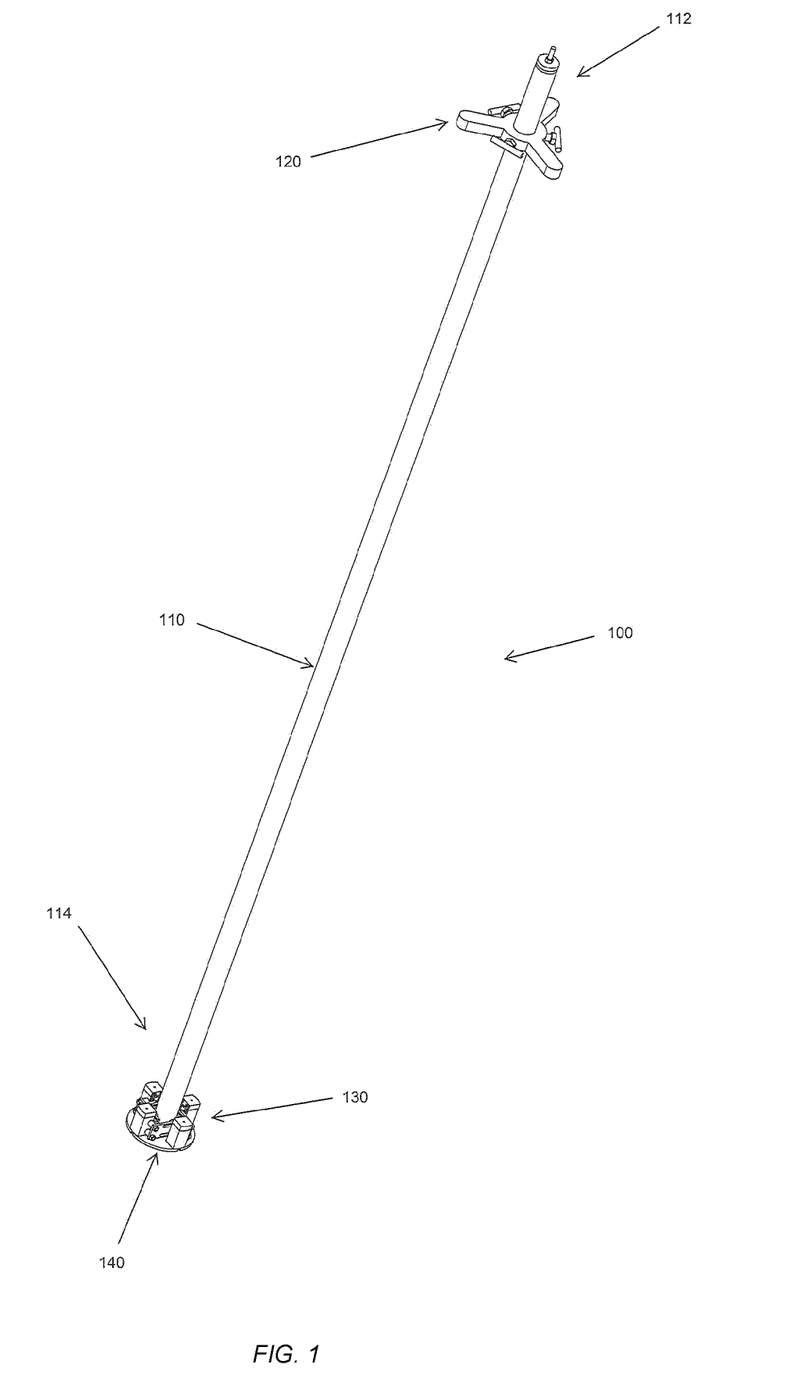
FIG. 1 is an isometric view illustrative of one embodiment of a downhole welding tool capable of sealing a wellbore casing by exothermically welding a blanking plate in a wellbore casing.
Figure 2:
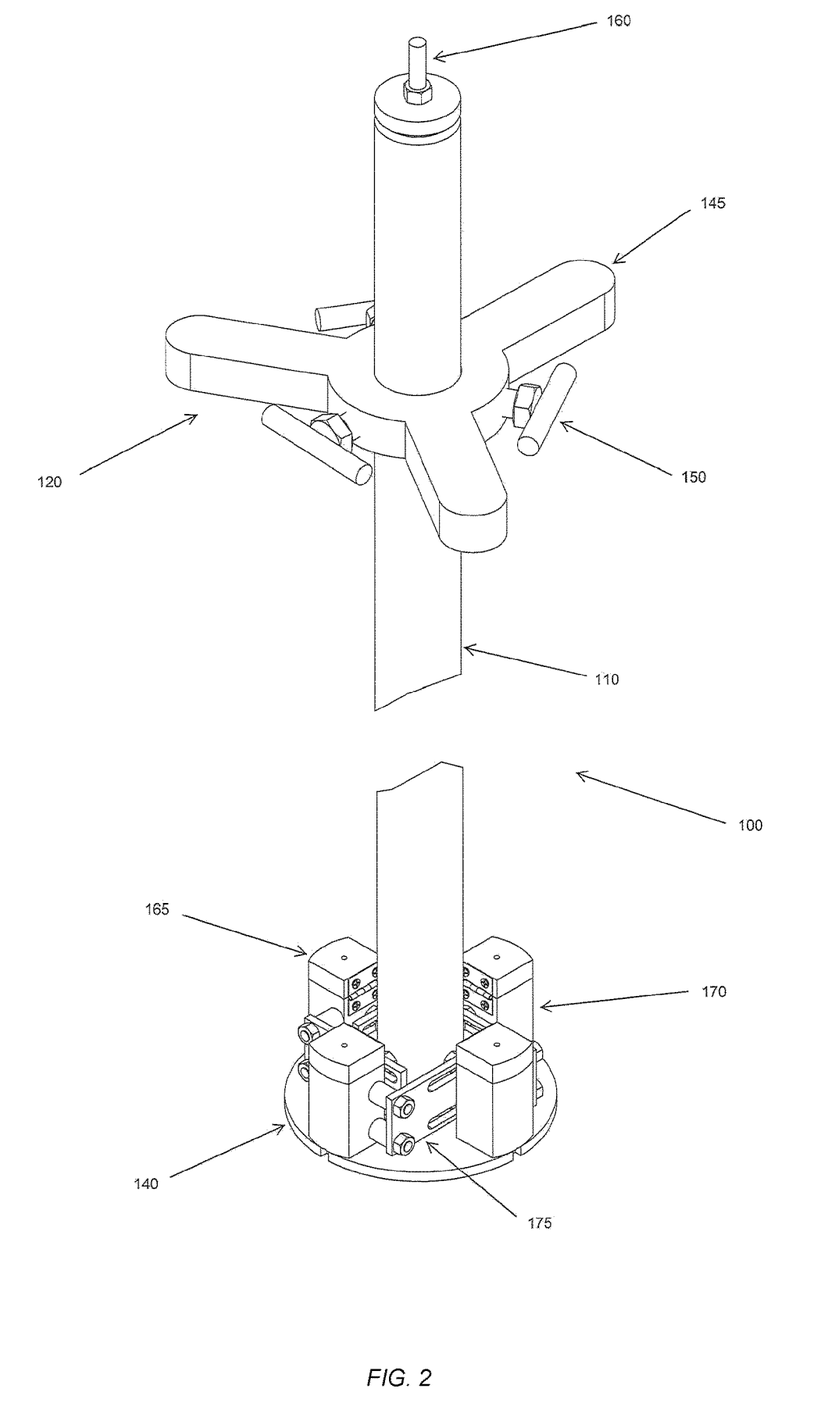
FIG. 2 is a detailed schematic view of the embodiment of the downhole welding tool shown in FIG. 1.

The tubular body 110 has a downhole end 114 opposite a surface end 112. The downhole end 114 is intended for to be placed downhole while the surface end 112 is intended to be placed near or above surface.

At the downhole end 114 of the tubular body 110 is a welding head assembly 130 for comprising the various welding components as well as for retaining the blanking plate 140 for use in sealing the wellbore casing once welded thereto. FIGS. 2 to 5 show one embodiment of the welding head assembly 130 in more detail.

Figure 3:
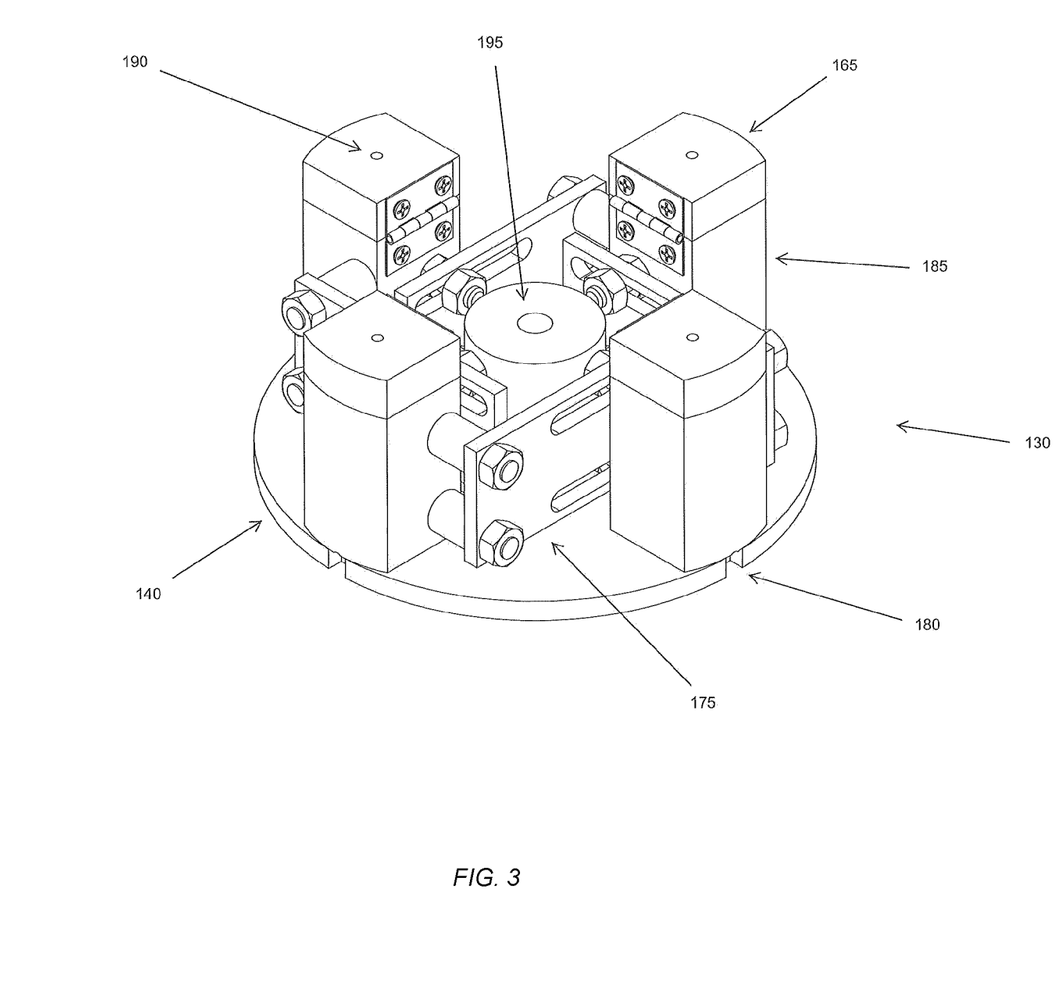
FIG. 3 is a detailed schematic view illustrative of one embodiment of a welding head assembly of a downhole welding tool.

The welding head assembly 130 comprises a connector device (not shown) for retaining the blanking plate 140 to be welded to the internal surface of the wellbore casing 200. The connector device may be any suitable device that permits releasable connection of the welding head assembly to the blanking plate 140. For example, a threaded connector may be used to releasably connect the welding head assembly 130 to the blanking plate 140 wherein a threaded collar on the blanking plate 140 may be threaded into a threaded aperture on the welding head assembly 130. This allows for disconnection of the tool 100 from the blanking plate 140 after it has been welded in place. Alternatively, a magnet may be use to retain the blanking plate 140.

The welding head assembly 130 also comprises one or more welding powder containers 170, which are shown in FIGS. 1 to 5 in the form of spot welding fixtures and also sometimes referred to as welding crucibles. Each spot welding fixture 170 comprises a weld fixture body 185 that defines a welding powder chamber 210 adapted to receive an exothermic welding powder, such as thermite. In the embodiments shown, the welding powder containers 170 also include a hingidly attached reservoir cap 165, sometimes referred to as a crucible cap, for sealing off the chamber 210. The welding powder containers 170 include a ignitor wire opening 190 for allowing passage of an ignitor wire 225, such as a nichrome wire. During use, the ignitor wire 225 should be imbedded in exothermic welding powder before ignition for proper ignition of the welding powder.

Figure 4:
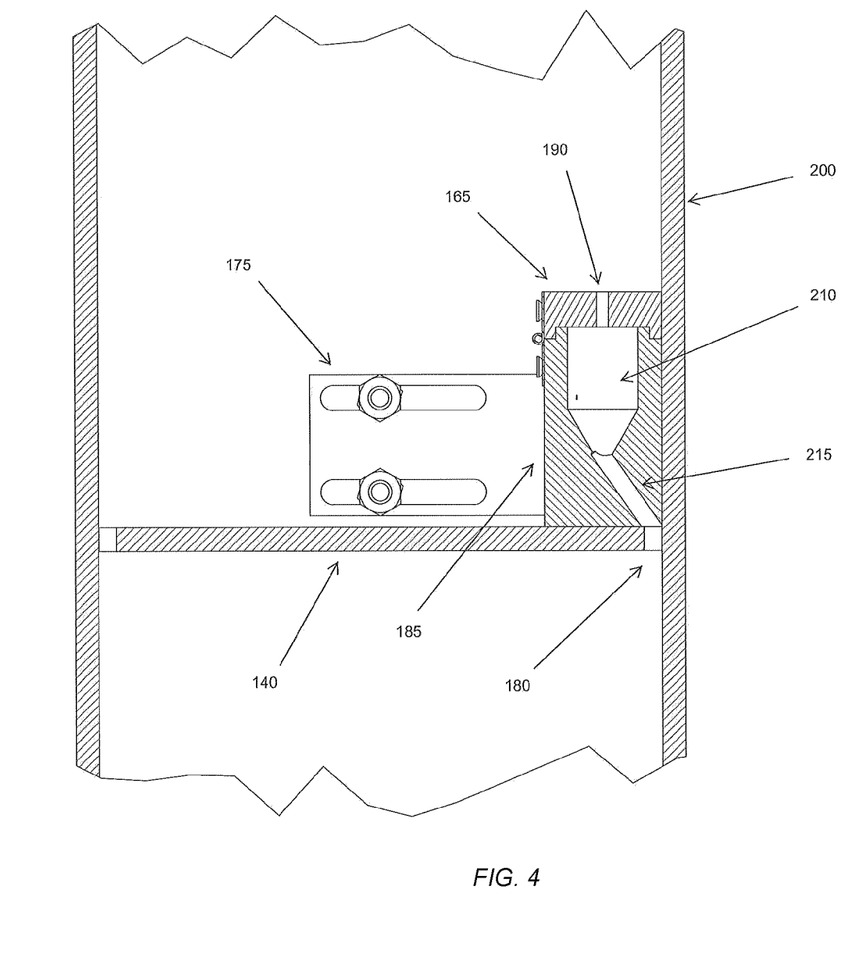
FIG. 4 is a cross-sectional view illustrative of various components of one embodiment of a welding head assembly positioned downhole in a casing.
Figure 5:
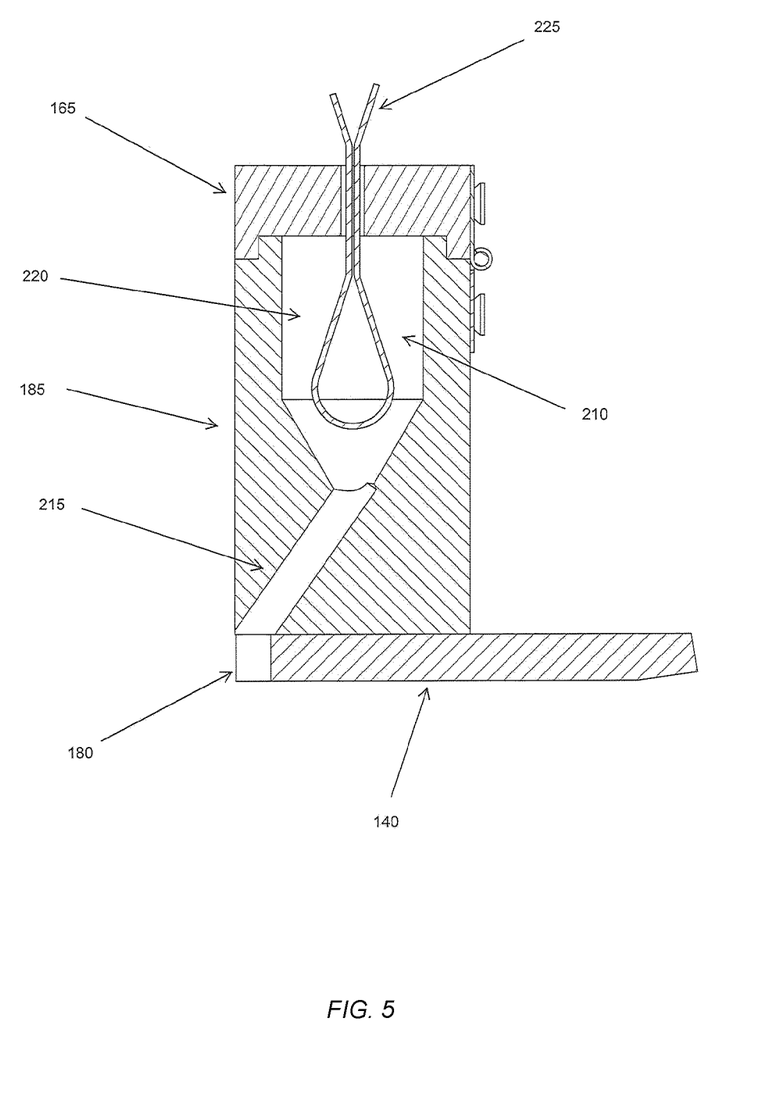
FIG. 5 is a cross-sectional view illustrative of one embodiment of a weld fixture in contact with a blank plate.

The powder chamber 210 is shaped to position any powder therein to be in proximity or adjacent the blanking plate 140 in addition to the wellbore casing when inserted in the wellbore. As a result, when the exothermic powder is ignited an exothermic weld, also sometimes referred to as exothermic bonding, thermite welding or thermit welding, is created by an exothermic reaction of the welding powder to generate a molten metal that joins the blanking plate 140 to the wellbore casing.

An optional channel 215 may be incorporated into the chamber 210 to better situate powder placed therein into a suitable position in proximity to the surfaces to be welded.

In one embodiment, to allow for a more effective weld of the blanking plate 140 to the wellbore casing 200, the blanking plate 140 may have a fusing notch 180 which corresponds to the outlet of the chamber 210 or channel 215 such that the molten metal exits the chamber 210 or the channel 215 upon ignition and fills the notch 180.

A combustible barrier, not shown, may be placed over the exit of the chamber 210 or channel 215 to prevent spillage of the exothermic welding powder from the chamber 210 or channel 215 before ignition. After ignition, the molten metal generated by the exothermic reaction of the powder simply burns away the barrier and the molten metal exits the chamber 210 or channel 215 welding the blanking plate 140 to the wellbore casing 200.

Figure 7:
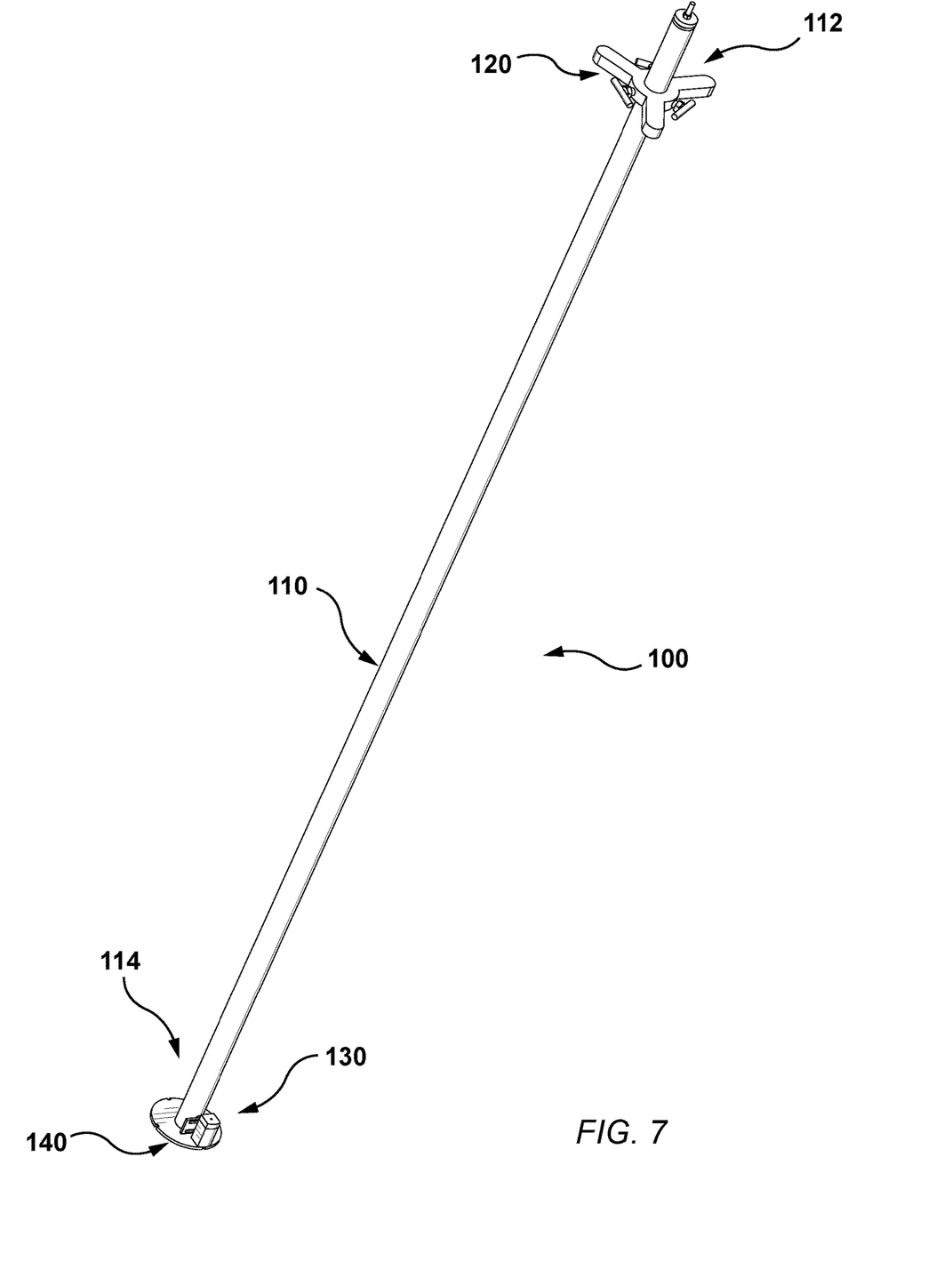
FIG. 7 is an isometric view illustrative of another embodiment of a downhole welding tool capable of sealing a wellbore casing by exothermically welding a blanking plate in a wellbore casing, the welding tool having a welding head assembly that comprises a single weld fixture.
Figure 8:
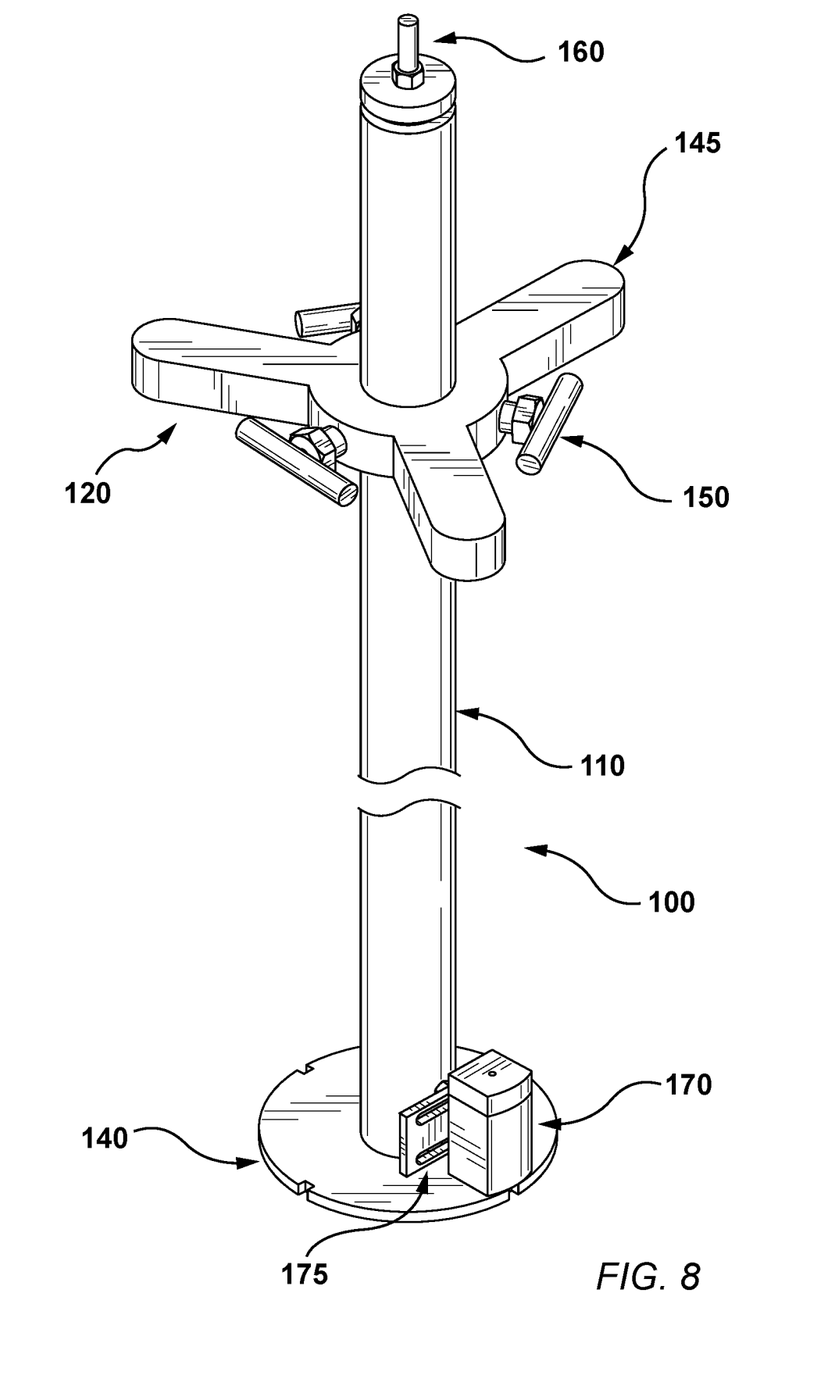
FIG. 8 is a detailed schematic view of the embodiment of the downhole welding tool shown in FIG. 7.

It will be appreciated that although four welding powder containers in the form of weld fixtures 170 are shown in FIGS. 1 to 5, any suitable number of fixtures may be used about the periphery of the welding head assembly 130. In one embodiment, as shown in FIGS. 7 and 8, a single welding powder container 170 is implemented and, for example, may be in the form of a weld fixture or weld crucible.

A collar 195 may be situated at the center of the welding head assembly 130 for secured attachment of the components of the welding head assembly 130 thereto. The welding head assembly 130 may be detachable from the tubular body 110 to allow different welding head assemblies to be used as needed. The collar 195 may serve as the attachment device for connection of the welding head assembly 130 to the tubular body 110.

Optionally, to allow for radial adjustment of the welding powder containers 170 to accommodate wellbore casings of various sizes, a radial adjustment device 175 in connection with the welding powder containers 170 for permitting radial movement of the welding powder containers 170. Any suitable radial adjustment device 175 may be used to adjust the radial position of the welding powder containers 170. A bracket is shown as being used but may be replaced with a rod and clamp setup. If a single welding powder container 170 is implemented, the radial adjustment device may be omitted and the welding powder container 170 may be connected directly to the tubular body 110 using any suitable connector such as a mounting bracket, clamp, etc., as shown in FIG. 8 or the powder container 170 may be mounted directly to the tubular body 110.

To adjust the depth that the tool 100 extends into the wellbore casing 200 an optional depth adjustment assembly 120 may be used. The depth adjustment assembly 120 may use a friction hold to prevent the tool from dropping further into the wellbore casing 200 by either extending outwards from the tubular body 110 to abut against the casing or by extending beyond the diameter of the casing to rest on top of the wellbore or wellbore head, also considered to be a friction hold. The depth adjustment assembly can also serve to stabilize the tool 100 to allow for a more effective weld.

The depth adjustment assembly 120, in one embodiment, may include a depth stop plate 145 that extends radially beyond the diameter of the casing so that it rests on top of the casing or wellhead and may be secured to the tubular body 110 using any suitable means such as a clamp 150. An aperture in the center of the depth stop late 145 is sufficient to accommodate the tubular body 110 and allows travel of the depth stop plate along the tubular body 110 to adjust the depth of penetration of the tool 100 into the wellbore casing 200.

A retaining rod 160 may be implemented to connect and disconnect the blanking plate 140 from the tool 100. The retaining rod 160 passes through the tubular body 110 and out bottom thereof and may form part of the connect device for retaining the blanking plate 140. The retaining rod 160 may, for example, disconnect a magnet used for retaining the blanking plate 140 if such a device is used.

An ignitor wire 225, such as a nichrome wire, may be used to ignite the exothermic welding powder to initiate the weld. The ignitor wire 225 are for connection to a suitable switchable power source, such as an ignition control including a remote ignition control, for initiating a suitable power charge to start the exothermic reaction. Although not shown, it is contemplated that the tool 100 may be include further components that allow for management and/or dressing of the wires 225 along the tool 100 such as clamps for example alligator clamps (not shown). The ignitor wire should be imbedded in the exothermic welding powder 220 for proper ignition.

Following use of the tool 100, the welding powder containers 170, such as the spot welding fixtures, may simply be cleaned and refilled for further use. The ignitor wire 225 must also be replaced and the tool may be further used for sealing a wellbore casing or for otherwise welding a well component downhole.

Figures 6A, 6B:
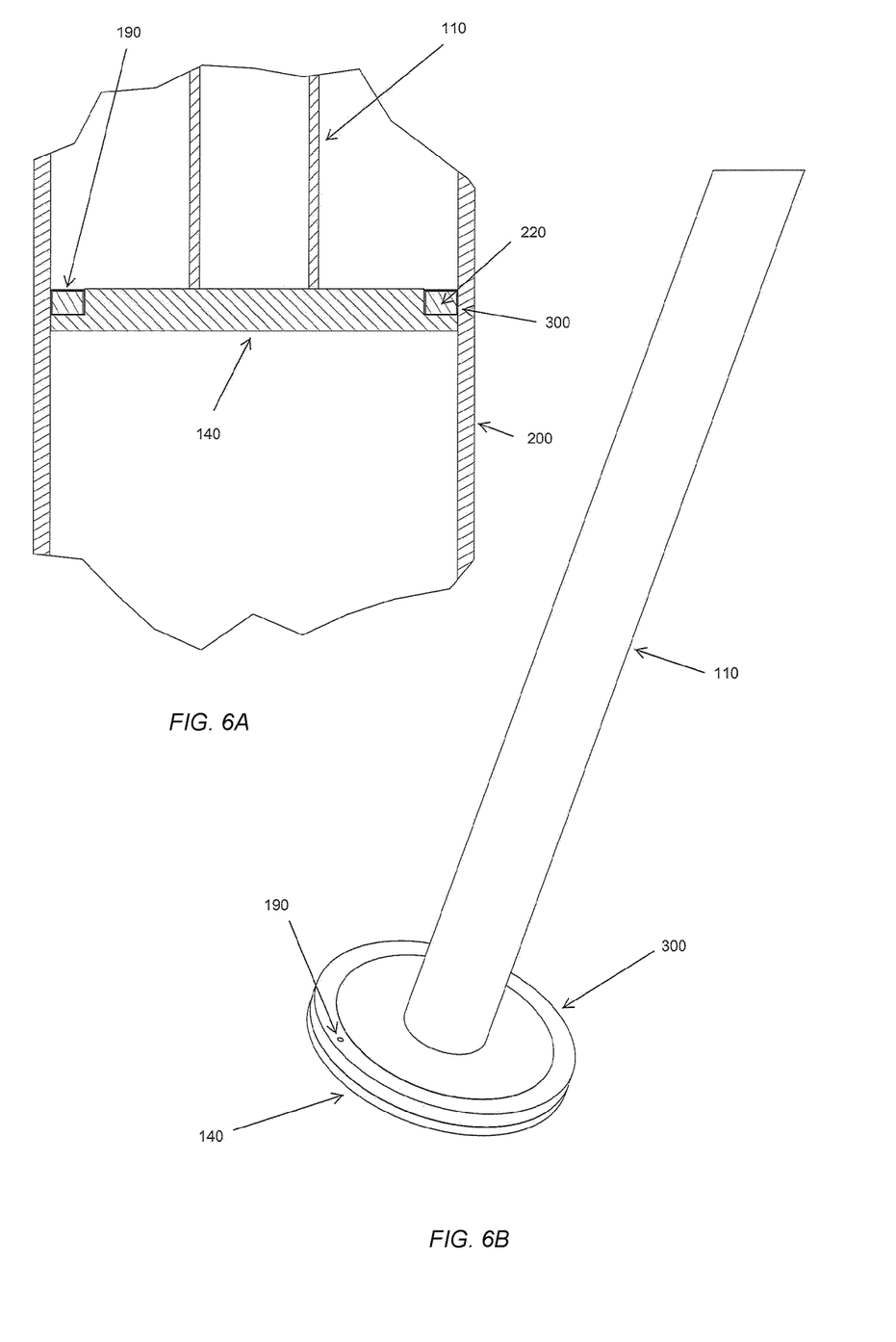
FIG. 6A is an isometric view illustrative of a further embodiment of a downhole welding tool capable of sealing a wellbore casing by exothermically welding a blanking plate in a wellbore casing.
FIG. 6B is a cross-sectional view of the welding head assembly of the downhole welding tool of FIG. 6A shown positioned in a wellbore casing.

A further embodiment of a downhole welding tool is shown in FIGS. 6A and 6B. The tubular body 110 and depth adjustment assembly may be similar to those described above with reference to FIGS. 1 to 5. However, the welding head assembly is significantly different. The individual spot welding fixtures have been replaced with a single tubular ring 300 defining a powder chamber for holding the exothermic welding powder. The tubular ring has a suitable diameter to be substantially proximate the internal circumference of the wellbore casing into which the tool 100 is to be inserted. The tubular ring 300 is comprised of a combustible material sealing the ring from the blanking plate 140 to be retained. Upon ignition of the weld powder the molten metal burns away the tubular ring material thereby contacting the blanking plate 140 and the wellbore casing 200. The blanking plate 140 may have a bevelled peripheral edge to accommodate the molten metal and ensure that it does not flow away from the casing wall. In one embodiment, the combustible material is a foil wrapped around the welding powder.

It will be appreciated that any suitable exothermic welding powder 220 may be used to create an exothermic weld between the blanking plate 140 and the wellbore casing 200. Those of skill in the art will be aware of various suitable powders including thermite.

It will also be appreciated that the tool 100 may be used to weld other well components to a downhole surface of a wellbore casing or component thereof and the invention is not limited to the welding of only blanking plates to the interior wall of the casing.

In one embodiment a welding system is provided that includes both the tool 100 in addition to the ignition wires 225 and the ignition control. Optionally the system may include the exothermic welding powder.

In a further embodiment, a method of sealing a wellbore casing is provided. The method includes the implementation of a downhole welding tool such as those described herein. The powder containers are filled with an exothermic welding powder such that the ignitor wire is imbedded in the exothermic welding powder. A blanking plate is connected to the welding head assembly and the welding tool is placed in the wellbore casing at the desired depth. The ignitor wires are connected to the ignition control and the exothermic welding power may then be ignited.

It will be appreciated that the present invention has been described with reference to various embodiments and examples, all of which are intended for illustrative and non-limiting purposes. Various modifications, alterations, adjustments, substitutions and revisions may be made without departing from the scope or spirit of the invention.

We claim:

1. A welding tool for welding a well component to a downhole surface of a wellbore casing or component thereof, the welding tool comprising:
   a tubular body of a diameter sufficiently narrow to fit in a wellbore casing, the tubular body having a downhole end and a surface end; and
   a welding head assembly connected to the downhole end of the tubular body, the welding head assembly comprising:
      a connector device for retaining a well component to be welded to a downhole surface of the wellbore casing or component thereof, and
      a welding powder container comprising:
         a chamber for holding the exothermic welding powder, the chamber having at least a portion extending adjacent the well component to be retained and proximate the downhole surface to which the well component is to be welded when the welding tool is positioned downhole in the wellbore casing; and
         an igniter wire opening for accommodating an igniter wire extending into the chamber,
         wherein the welding powder container is spaced from the tubular body.

2. The welding tool of claim 1, further comprising a depth adjustment assembly connected to the tubular body, the depth adjustment assembly for controlling the depth into the wellbore casing to which the tubular body extends.

3. The welding tool of claim 2, wherein the depth adjustment assembly comprises a portion having a diameter sufficient to friction hold the welding tool against the casing.

4. The welding tool of claim 2, wherein the depth adjustment assembly comprises:
   a central aperture for receiving the tubular body thereby permitting slideable passage of the depth adjustment assembly along the tubular body; and
   a retention device for securing the depth adjustment assembly to the tubular body.

5. The welding tool of claim 4, wherein the retention device comprises a clamp for securing the depth adjustment assembly to the tubular body.

6. The welding tool of claim 1, wherein the connector device for retaining the well component comprises a threaded connector for threaded interaction with a corresponding threaded connector situated on the well component.

7. The welding tool of claim 1, wherein the welding powder container is a weld fixture comprising a weld fixture body defining the chamber and a hingedly attached reservoir cap permitting access to the chamber for filling thereof with the welding powder when in an opened position and substantially sealing the chamber when in a closed position.

8. The welding tool of claim 7, wherein the weld fixture body comprises an internal channel extending from the chamber to adjacent the well component to be retained and proximate the downhole surface to which the well component is to be welded when the welding tool is positioned downhole in the wellbore casing.

9. The welding tool of claim 7, wherein the welding head assembly comprises a plurality of weld fixtures situated at various points adjacent the well component to be retained and proximate the downhole surface to which the well component is to be welded when the welding tool is positioned downhole in the wellbore casing.

10. The welding tool of claim 1, further comprising a combustible barrier sealing the chamber from the well component to be retained, the combustible barrier combusting upon contact with ignited weld powder.

11. The welding tool of claim 1, further comprising a radial adjustment device in connection with the welding powder container for permitting radial movement of the welding powder container to accommodate wellbore casings of a different diameter.

12. The welding tool of claim 1, wherein the welding powder container is a tubular ring having a suitable diameter to be substantially proximate the internal circumference of the wellbore casing into which the tool is to be inserted, and wherein the tubular ring is comprised of a combustible material sealing the ring from the well component to be retained, the combustible material combusting upon contact with ignited weld powder.

13. The welding tool of claim 1, wherein the well component is a blanking plate for sealing the wellbore casing.

14. The welding tool of claim 13, wherein the blanking plate comprises a threaded connected for permitting retention to the connector device.

15. The welding tool of claim 1, further comprising an ignitor wire for extension from the powder chamber through the ignitor wire opening and for connection to a remote ignition control.

16. The welding tool of claim 15, further comprising one or more wire retention devices for securing the wire to the tubular body.

17. The tool of claim 1 wherein the exothermic welding powder is a thermite welding powder.

18. A welding tool for welding a blanking plate within a wellbore casing downhole thereby sealing the wellbore, the welding tool comprising:
   a tubular body of a diameter sufficiently narrow to fit in a wellbore casing, the tubular body having a downhole end and a surface end; and a welding head assembly connected to the downhole end of the tubular body, the welding head assembly comprising:
- a connector device for retaining a blanking plate to be welded within the wellbore casing, and
- a welding powder container comprising:
  - a chamber for holding the exothermic welding powder, the chamber having at least a portion extending adjacent the blanking plate to be retained and proximate the wellbore casing to which the blanking plate is to be welded when the welding tool is positioned downhole in the wellbore casing; and
  - an igniter wire opening for accommodating an igniter wire extending into the chamber,
    wherein the welding powder container is spaced from the tubular body.

19. A welding tool for welding a well component to a downhole surface of a wellbore casing or component thereof, the welding tool comprising:
- a tubular body of a diameter sufficiently narrow to fit in a wellbore casing, the tubular body having a downhole end and a surface end; and
- a welding head assembly connected to the downhole end of the tubular body, the welding head assembly comprising:
  - a connector device for retaining a well component to be welded to a downhole surface of the wellbore casing or component thereof, and
  - a single welding powder container comprising:
    - a weld fixture comprising:
      - a weld fixture body defining a chamber for holding the exothermic welding powder, the chamber having at least a portion extending adjacent the well component to be retained and proximate the downhole surface to which the well component is to be welded when the welding tool is positioned downhole in the wellbore casing; and
      - a reservoir cap permitting access to the chamber for filling thereof with the welding powder when in an opened position and substantially sealing the chamber when in a closed position; and
    - an igniter wire opening for accommodating an igniter wire extending into the chamber.

20. The welding tool of claim 19, wherein the well component is a blanking plate for sealing the wellbore casing.

* * * * *